(12) United States Patent
Wittwer

(10) Patent No.: US 11,467,561 B2
(45) Date of Patent: Oct. 11, 2022

(54) AUTOMATIC PARAMETERISATION OF A LASER CUTTING METHOD

(71) Applicant: BYSTRONIC LASER AG, Niederoenz (CH)

(72) Inventor: Stefan Wittwer, Herzogenbuchsee (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/415,922

(22) PCT Filed: Dec. 16, 2019

(86) PCT No.: PCT/EP2019/085291
§ 371 (c)(1),
(2) Date: Jun. 18, 2021

(87) PCT Pub. No.: WO2020/127004
PCT Pub. Date: Jun. 25, 2020

(65) Prior Publication Data
US 2022/0043421 A1 Feb. 10, 2022

(30) Foreign Application Priority Data

Dec. 19, 2018 (EP) ..................... 18214096

(51) Int. Cl.
G05B 19/4097 (2006.01)
B23K 26/70 (2014.01)
B23K 26/38 (2014.01)

(52) U.S. Cl.
CPC .......... *G05B 19/4097* (2013.01); *B23K 26/38* (2013.01); *B23K 26/702* (2015.10); *G05B 2219/45041* (2013.01)

(58) Field of Classification Search
CPC .................. G05B 19/4097; G05B 2219/45041
(Continued)

(56) References Cited

U.S. PATENT DOCUMENTS 10,675,709 B2   6/2020  Luedi et al.
2003/0234240 A1* 12/2003 Yamazaki ............ B23K 26/702
                                                            219/121.62
(Continued)

FOREIGN PATENT DOCUMENTS

CN       104200063       * 12/2014
EP         1375052 A1       1/2004
WO    WO 2018/046948      *  3/2018

OTHER PUBLICATIONS

Abhijit S. Badwe et al., "Detection of model-plant mismatch in MPC applications", Journal of Process Control 19 (2009) 1305-1313.

*Primary Examiner* — Hien D Khuu
(74) *Attorney, Agent, or Firm* — Jacob Eisenberg

(57) ABSTRACT

A high current contact is disclosed having a contact pin for insertion into the high-current socket having a plurality of contact segments that are slotted in a radial direction for contacting an inner contact surface of the high-current socket; a guide sleeve surrounding the contact pin, which, by means of an at least central front pressing against the high-current socket relative to the contact pin in an axial direction from an initial position, in which the guide sleeve blocks an independent radial spreading of the contact segments in order to avoid a contact between the contacts segments protruding axially from the guide sleeve and the inner contact surface, is movable into a contact position that is set back with respect to the contact pin and in which the guide sleeve unblocks an independent radial spreading of the contact segments protruding from the guide sleeve for contacting the inner contact surface.

6 Claims, 13 Drawing Sheets

(58) Field of Classification Search
USPC .......................................................... 700/166
See application file for complete search history.

(56) References Cited

U.S. PATENT DOCUMENTS

| | | | |
|---|---|---|---|
| 2006/0102601 A1 | 5/2006 | Shirk et al. | |
| 2007/0073905 A1* | 3/2007 | Cynthia | A61F 9/00804 710/1 |
| 2007/0078530 A1 | 4/2007 | Blevins et al. | |
| 2010/0174392 A1 | 7/2010 | Fink et al. | |
| 2012/0290276 A1 | 11/2012 | Schulz et al. | |
| 2013/0041482 A1 | 2/2013 | Badwe et al. | |
| 2017/0113300 A1* | 4/2017 | Ludi | B23K 31/125 |
| 2017/0364058 A1* | 12/2017 | Jagdale | G05B 19/4099 |
| 2018/0275621 A1 | 9/2018 | Kniazev et al. | |
| 2018/0356778 A1 | 12/2018 | Acharya et al. | |
| 2021/0034798 A1* | 2/2021 | Bruneel | B23K 26/00 |

* cited by examiner

AUTOMATIC PARAMETERISATION OF A LASER CUTTING METHOD

CROSS REFERENCE TO RELATED APPLICATIONS

This application is a national phase application of International Application No.: PCT/EP2019/085291, filed on Dec. 16, 2020 and further claims priority to European patent application EP18214096.2, filed on Dec. 19, 2018, the content of both of which is incorporated herein by reference.

BACKGROUND OF THE INVENTION

The present disclosure relates to the field of laser machining tools, and more particularly to methods and systems for automatically parameterising a laser installation or laser cutting method and for forecasting result data.

Depending on the desired machining, different types of laser machining tools can be used today to produce high-precision and high-performance manufactured components. For example, Nd:YAG (1064 nm) and CO2 lasers are used for micromachining semiconductor substrates. Using Yb:YAG fibre lasers and CO2 lasers with several kilowatts output power, among other things metal workpieces up to several tens of millimetres in thickness are cut in macromachining. These and other application examples make it clear that the control and monitoring of the quality, stability, productivity, and other variables is indispensable for a machining result produced on the manufactured component by means of laser machining. In certain applications it is important, for example, to monitor the angle of inclination of the cut edge, which is dependent, among other things, on the focus position with which the laser beams are focused on the workpiece. The physical relationship, in this example, between the focus position as a machining parameter and the inclination angle of the cut edge as a machining result parameter, plays an important role here in determining the appropriate parameters for laser machining.

In the prior art, if it is desired to achieve a certain machining result (e.g., a specific quality measure of the manufactured components, which can sometimes be reflected in a formation of burr and/or of slag and/or in a roughness of the cut edge), empirical knowledge is used to set the respective machining parameters on the respective machine with the respective technical properties (such as beam tool type, nozzle, etc.) such that the desired level of quality can be achieved. It is obvious that this procedure requires a great deal of experience on the one hand, and on the other hand is not reproducible and therefore error-prone. Moreover, the method is time-consuming because it is not scalable, since at least one test run (and frequently multiple iterations of test runs) must be carried out to determine by a trial-and-error method those setting parameters which to produce the desired result (machining result), wherein this must be repeated for each material and each type of installation.

To achieve reproducibility and scalability, it is generally desirable to be able to calculate the interaction between the parameters with which the laser machining tool is operated, the associated physical process characteristics, and the resulting machining result.

EP 2 533 934 B1 discloses a method for determining the quality of the machining result using a simulation program. This document does not disclose how the generated model can be adjusted, improved, and developed during operation based on calculated comparison values. In addition, this document does not indicate any parameterisation method which automatically calculates a parameter set for a desired target specification for the machining result.

US 2017/0113300 A1 discloses a method for monitoring a laser machining in which after an interruption of the cutting procedure, the quality of the machining on the workpiece is detected and compared with a quality specification. The cutting parameters can be adjusted in case of deviation. However, the document does not describe how the cutting parameters should be adjusted. A person skilled in the art cannot infer from this document any instructions on specifically how the setting parameters should be changed to achieve a better cutting result. In addition, this document too discloses no parameterisation method.

BRIEF SUMMARY OF THE INVENTION

The present disclosure therefore addresses the problem of improving the operation of a laser machining tool. In particular, the operation should be simplified for the user, the method throughput increased, and the quality of the manufacturing process improved. Furthermore, the relevant parameters for the machining procedure and the physical relationships thereof with the machining process and the machining result should be calculated (parameterisation method).

This problem is solved by a forecasting method, a parameterisation method, a computer program, a parameterisation module, a forecasting module, a laser machining tool and a system according to the appended independent patent claims, wherein the aforementioned objects access at least three different data structures (machining parameters, process characteristics, machining results). Advantageous embodiments, further features and advantages emerge from the dependent claims and the following description.

According to a first aspect, the invention relates to a forecasting method for a machining result for a laser machining method. The following method steps are used in the forecasting method:

reading in of a machining parameter set which serves to drive a laser machining tool;

accessing a deterministic process model in order to calculate a forecasting dataset for the machining result for the read-in parameter set. The deterministic process model accesses at least three different data structures in order to model physical, multidimensional relationships between
a. the respective parameter set and
b. the process characteristics representing the physical laser machining process in the process zone, and
c. the machining result.

In an advantageous embodiment of the present disclosure, the forecasting method can comprise further processing steps which store the calculated forecasting dataset, e.g., in a database, and/or to output same to an output unit (e.g., graphically, on a monitor/terminal). In addition, the calculated forecasting dataset can be subjected to a verification check (e.g., checking a plausibility, using predefined rules or comparing with historical data and/or with a statistical mean, etc.).

The inventor has recognised that the previous method for operating laser machining tools is deficient inasmuch as specific empirical knowledge of several interactive physical processes in the machining zone is required in order to be able to optimally control the laser process with respect to a desired machining result and with a specified parameter set (in the following, this term is used to mean the same as the term machining parameter set) for setting the laser, the entire laser machining installation, the contour of the produced workpiece and/or the machining result on the workpiece, in order to be able to predict how the machining result (on the manufactured component: cut edge, roughness, etc.) will appear. In particular, certain physical relationships concerning the laser machining process on the workpiece have so far only been analysed empirically. A calculation of these relationships and relevant variables was not possible. Based on this initial situation, a deterministic process model was developed that models the physical multicausal relationships between the parameter set for setting the laser, the process characteristics in the process zone, and the machining result. The well-known mathematical systems of equations (e.g., R. Poprawe, "Lasertechnik für den Fertigung" [Laser Technology for Manufacturing], Springer-Verlag 2005, p. 455) for laser machining were suitably adapted and simplified in order to be able to achieve a performance for the model-based algorithms which is tailored to the industrial application. All of the above-mentioned method steps can be referred to collectively as a simulation of the real laser machining.

According to this proposal, the equation systems for industrial manufacturing which are generally known in the prior art are selected and simplified. The equations of the model core are time-dependent conservation equations of physics. They are universally valid and therefore applicable to the multiple physically related operations in the laser machining process zone. In the model, the equations for the conservation variables of mass (or particles), energy, and momentum relevant to the process zone are implemented in the solid, liquid, and gas aggregation states. These equations for the liquid aggregation state (melt) and in stationary formulation are frequently noted in the specialist literature (e.g., D. Schuöcker, "Dynamic Phenomena in Laser Cutting and Cut Quality", Appl. Phys. B 40, p. 9-14, 1986). They enable a mathematical and numerically feasible yet complete modelling of the cutting physics in the process zone, and thus form an extensible numerical framework for solving the problem. Advantageously, the conservation equations in the model are extended from the stationary formulation to the time-dependent formulation. This provides maximum accuracy while taking into account the limited computational capacities for process characteristics or parameter sets in industrial applications. In other words, the model is based on a model core in which the conservation equations simultaneously meet all of the following technical criteria: They are physically valid and can be implemented numerically, so that they can be calculated on the machine directly on site at a reasonable cost and within a reasonable computing time. The model core is also extensible. A TARGET/ACTUAL comparison between the forecast machining result and the measured ACTUAL machining result can be used to develop new versions of the model core if there is a deviation.

In particular, the following coupled conservation equations of the first-stage model core for the liquid state of the cut edge of the machined workpiece (representative of the machining result) in the time domain can be considered in the case where the melting point $T_m$ of the workpiece is less than the temperature of the molten surface T:
the conservation equation for the mass flow of the melt:

$$\frac{dm_m}{dt} = \rho_m \cdot \frac{D\langle b_c \rangle}{\sqrt{1-\mu^2}} \cdot \left(\frac{d\langle D_m \rangle}{dt} + \frac{\mu}{1-\mu^2} \cdot \frac{d\mu}{dt} \cdot \langle D_m \rangle\right) = B_m(t)$$

the conservation equation for the energy flow (power balance) of the melt:

$$\frac{dE_m}{dt} = \frac{c_p}{2} \cdot m_m \cdot \frac{dT}{dt} + \left(\frac{c_p}{2} \cdot (T + T_m) + h_m\right) \cdot \frac{dm_m}{dt} = B_E(t)$$

the conservation equation for the momentum flow (force) of the melt:

$$\frac{dp_m}{dt} = \frac{1}{4} \cdot \left(m_m \cdot \frac{dv_j}{dt} + v_j \cdot \frac{dm_m}{dt}\right) = B_p(t)$$

(wherein p and B are vector sizes and should be represented in bold). The following conservation equations of the model core can be considered for the liquid state of the cut edge of the machined workpiece at the second stage in the time domain in case the melting point $T_m$ of the workpiece is smaller than the temperature of the molten surface T:
the conservation equation for the average thickness of the melt $(D_m)$:

$$\frac{d\langle D_m \rangle}{dt} = \frac{\sqrt{1-\mu^2}}{\rho_m \cdot D\langle b_c \rangle} \cdot B_m(t) - \frac{\mu}{1-\mu^2} \cdot \frac{d\mu}{dt} \cdot \langle D_m \rangle$$

the conservation equation for the absolute, i.e., surface temperature (T) of the melt:

$$\frac{dT}{dt} = \frac{2}{m_m \cdot c_p} \cdot \left(B_E(t) - \left(\frac{c_p}{2} \cdot (T + T_m) + h_m\right) \cdot \frac{dm_m}{dt}\right)$$

the conservation equation for the ejection speed $v_j$ of the surface of the melt at the bottom side of the workpiece:

$$\frac{dv_j}{dt} = \frac{1}{m_m} \cdot \left(4B_p(t) - \frac{dm_m}{dt} \cdot v_j\right)$$

(wherein v is a vector size), with:
a.

$$\frac{dm_m}{dt} = B_m(t),$$

with the following legend:
$B_E$ balance function of the energy flow (input flow minus output flow of melt energy)
$B_m$ balance function of the mass flow (input flow minus output flow of melt mass)
$B_p$ balance function of the momentum flow (input flow minus output flow of melt momentum), (vector size)
D thickness of the workpiece
$\langle D_m \rangle$ average thickness of the melt
$E_m$ thermal energy of the melt
T temperature of the surface of the melt
$T_a$ Umgebungstemperatur ambient temperature
$T_m$ melting temperature of the workpiece
$\langle b_c \rangle$ average joint width
$c_p$ specific heat capacity $h_m$ specific enthalpy of fusion (latent heat)
$m_m$ mass of the melt
$p_m$ momentum of the melt, (vector size)
$v_c$ machining speed (feed), (vector size)
$v_j$ ejection speed of the surface of the melt
t time
µ cosine of the melt front inclination angle
$\rho_m$ mass density of the melt.

The process model advantageously offers a modular design with several invertible algorithms (algorithm for a forecasting method and algorithm for a parameterisation method) and at least three different data structures as interfaces between the algorithms and the outside world. Due to the invertibility of the algorithms, the data flow of the deterministic process model can be reversed; in this way, they map both input data into result data and the inverse function thereof result data into input data. This has the advantage that by sequentially executing two algorithms on the same input/result data, the model can undergo a self-checking.

In a preferred embodiment of the invention, the forecasting method can additionally comprise the following steps:
executing the real laser machining with the read-in parameter set (for the machining parameters);
(preferably automatically) measuring the machining result as ACTUAL values;
comparing the measured ACTUAL values for the machining result with the forecasting dataset and outputting the (calculated) comparison values as a comparison result.

Optionally, preconfigured adaptation procedures can be automatically triggered based on the calculated comparison values to output the calculated comparison values. In particular, an adaptation of the process model can be carried out by adapting values in the at least three data structures thereof. Preferably, the respective adaptation procedure can be carried out directly on a machine terminal. It is also possible to execute the adaptation procedure centrally (e.g., on a server) and/or on workstations. In this case, the respective computers are in data connection with the unit on which the forecasting method is executed and/or the comparison result is provided. Furthermore, in the event of an identified deviation, the process model can be adapted by adapting the algorithms with version increment. After adaptation based on an identified deviation, the deterministic process model is considered to be validated. Further adaptation procedures can be carried out externally, in the outside world, e.g., as service on the machine in the case of large deviations and/or maintenance interventions in the measurement infrastructure, e.g., if measurement inaccuracies are detected. These adaptation procedures can be initiated automatically and verified, as needed, by a confirmation signal.

Thus, advantageously, the quality of the process model can be continuously and dynamically adapted to new technical boundary conditions and extended. Advantageously, this can also be done directly on site after delivery to the customer. The comparison result is preferably output or displayed locally on the machine (laser) on an output unit (e.g., terminal).

In an advantageous development of the disclosure, the access to the deterministic process model can take place by means of an application simulation algorithm and/or by means of a manufacturing forecasting algorithm.

According to a second aspect, the disclosure relates to a parameterisation method for the automatic calculation of a parameter set for the parameterisation of a laser machining method. The parameterisation method comprises the following method steps:

reading in of a TARGET value for a machining result;
accessing a deterministic process model in order to calculate at least one parameter set for the read-in TARGET value for the machining result that fulfils the read-in TARGET value, wherein the deterministic process model uses at least three data structures and models physical, multidimensional relationships between
a. the respective TARGET value for the machining result and
b. the process characteristics representing the physical laser machining process in the process zone, and
c. the machining result.

In an advantageous embodiment of the invention, an output of the calculated parameter set (for the machining parameters) to the control unit of the laser machining installation and/or a reading in into a database and/or an output to an output unit can be performed.

The parameterisation method is, so to speak, the digital counterpart to the forecasting method and mathematically inverse thereto. If the two methods are executed sequentially using an input vector, the respective input vector must again result. By providing the two methods, which are both computer-implemented and preferably implemented together on one module of the laser installation, it advantageously becomes possible to introduce and apply an additional verification level. Thus, the reliability of the model-based automatic method can be increased.

In a further preferred embodiment of the disclosure, the parameterisation method further comprises:
processing a real workpiece with the calculated parameter set;
measuring ACTUAL values for the machining result on the manufactured workpiece;
comparing between TARGET values and ACTUAL values for the machining result, and in the case of deviation:
outputting of the calculated comparison values as a comparison result.

The calculated comparison values can be used in a preferred embodiment of the disclosure for:
calibrating the calculated parameter set (to generate a calibrated parameter set) by accessing the deterministic process model so that the read-in TARGET value for the machining result can be maintained.

This has the advantage that the model can be improved continuously, dynamically, and on-site in operation with the customer.

In an advantageous development of the disclosure, the calculated comparison value can be used to regulate the laser machining process. With in situ process monitoring in the prior art, for example as disclosed in US 2017/0113300 A1, measurements on the process zone during machining (in situ) are possible. The measured variables such as joint width or trailing effects of the melt are also included as calculated process characteristics in one of the at least three data structures of the process model. Analogous to the steps documented above, a comparison result can be determined from the TARGET and ACTUAL values of the process characteristics, which can be used for the continuous recalculation of the machining parameter set.

This method is a model-based regulation, where measured values of a process monitoring are used as input to the corresponding algorithm for the deterministic process model. In the case of a model-based regulation, the steps of machining, measuring, comparing, and calibrating are iteratively repeated until a deviation between the TARGET value and the ACTUAL value for the machining result falls below a preconfigurable threshold value. The technical advantage lies in the fact that the regulation can be performed directly on the basis of the real generated machining result (measured values on the workpiece).

In a further embodiment of the disclosure, the access to the deterministic process model takes place by means of an application calibration algorithm and/or by means of an application calculation algorithm. This can be used to provide two modular applications, each with an inverse function on the process model.

According to another advantageous embodiment, the machining result is preconfigured. The machining result is a data tuple with measurable information on the quality of the laser machining method, in particular information on a burr height in a melt cut, a slag height in a flame cut, an edge slope, an edge waviness and/or an edge profile height, a surface roughness, a striation height and/or a striation frequency. Advantageously, the variables which are to be considered for the machining result can also be configured on-site during the application. This makes the process very flexible.

According to another advantageous embodiment, the deterministic process model is used to train a neural network.

In a further aspect, the disclosure relates to a computer program having program code or program means, wherein, if the computer program is executed on a computer or a computer-based processing unit, the computer program can be stored on a computer readable medium, wherein the program code or the program means causes a computer to execute a method according to the above-described parameterisation method or forecasting method.

The solution to the problem has been described above using the method. Features, advantages or alternative embodiments mentioned in this way are also to be transferred to the other claimed subject matters and vice versa. In other words, the apparatus claims in question (which are directed, for example, to a forecasting module or to a parameterisation module) can also be further developed with the features described and/or claimed in connection with the method and vice versa. The corresponding functional features of the method are thereby formed by corresponding modules, in particular by hardware modules or microprocessor modules, of the system or of the apparatus, and vice versa.

In another aspect, the disclosure relates to a parameterisation module for a laser machining tool for the automatic calculation of a parameter set for parameterisation of the laser machining tool, wherein the parameterisation module is designed to execute a parameterisation method as described above.

The parameterisation module preferably comprises an interface, in particular a network interface (e.g., CAN bus, e.g., according to the ISO 11898 standard).

In a further aspect, the invention relates to a forecasting module for a laser machining tool for automatically calculating a forecasting dataset for a machining result, wherein the forecasting module is designed to execute a forecasting method as described above.

In a further aspect, the disclosure relates to a laser machining tool with an (electronic) parameterisation module and/or with an (electronic) forecasting module.

In a further aspect, the disclosure relates to a system for operating a laser machining tool for machining workpieces.

The system can be designed comprising:
   the laser machining tool;
   a user interface for inputting and outputting data;
   a memory for storing the deterministic process model comprising:
   a. a first data structure in which a set of parameter sets is stored, wherein the first data structure represents a data interface to the laser machining tool;
   b. a second data structure in which a number of calculated process characteristics is stored;
   c. a third data structure in which a number of machining results is stored, wherein the third data structure represents a data interface to a measuring device for measuring machining results of the laser machining tool;
   an electronic processing unit designed to execute a set of model algorithms in the deterministic process model;
   a data connection between the data structures, the memory, the electronic processing unit, and the laser machining tool.

In a preferred embodiment of the disclosure, the electronic processing unit comprises a forecasting module and/or the parameterisation module.

In a further preferred embodiment, the deterministic process model undergoes automatic self-checking by sequentially executing inverse model algorithms for each input, in particular an application simulation algorithm and a manufacturing forecasting algorithm and an application calibration algorithm and an application calculation algorithm, and checking whether a result from the sequential execution is identical to the input.

In a further preferred embodiment, the input is a parameter set or a TARGET value for the machining result.

An important advantageous aspect of the values calculated with at least one (or both) of the proposed methods is that relevant analysis data can be provided directly during operation of the laser installation at the customer site. These can be used, for example, to trigger further measures (change of setting values, etc.). Thus, it is possible, for example, on the basis of real measurement data and/or the real behaviour/data of the laser installation to graphically display a height profile of a flame cutting edge (e.g. 15 mm) with a reference surface and a slag adhesion and to display in this graphic a rectangle over the horizontal side length of which the curve of the vertical cutting edge profile line is averaged. This can provide an important tool to directly analyse the physical laser machining process online and during operation. Overall, the quality of the laser machining can be improved, not only with respect to the quality parameter of the cut edge, but also other quality parameters such as slag and burr, etc., and the efficiency of the necessary adjustments can be both facilitated and improved.

In the following, the meaning of the terms used in this application will be explained in more detail.

The deterministic process model is a digital object in which are modelled the physical relationships between the respective parameter set and the process characteristics, which represent the physical laser machining process in the process zone, and the machining result. It should be expressly pointed out that the process model is not a statistical or stochastic model but rather a simulation model in which the relevant physical correlations of the laser machining are reproduced from various quality parameters and simulated. The process model includes at least three separate data structures in addition to the algorithms. The quality parameters are reflected in the third data structure with the machining result. The process model thus includes a complete modelling of various quality parameters that not only address the quality of the cut edge with the formation of striations and burring, but include other quality features that are discussed below in the context of the third data structure. In addition, the process model also includes the physical relationship between the respective quality feature or machining result and the parameter set and the process characteristics.

A first data structure contains the machining parameters. These machining parameters are also more briefly referred to as parameters. A data record of the (machining) parameters comprises:

the specification of the process gas, the machining head, the laser, the machining tool, the nozzle, the optics, and the workpiece the definition of the machining path (contour)

the interpolation point data along the machining path (contour) such as process gas pressure, feed, laser power, focus position, workpiece thickness, and many more.

The specifications and the machining path are determined by the machining infrastructure, the user-defined specific application (cutting plan), and the workpiece used. On the other hand, the interpolation point data can be varied independently, and therefore must be both the input of the forecasting module and the output of the parameterisation module.

A second data structure contains the process characteristics. A data record of process characteristics is assigned to exactly one interpolation point of the machining path and includes, among other things, the following properties:

of the laser beam tool such as time-average laser power, focal length (Rayleigh length), beam radius at the workpiece surface;

of the kerf, such as cross-sectional area, average kerf width, average cone angle;

of the cutting edge, such as the striation angle, the striation frequency, the roughness values;

of the melt, such as film thickness, ejection speed, flow characteristics, surface area, outlet area;

of the gas jet tool such as pressure-coupling degree, pressure loss (caused by the area between nozzle and workpiece);

of the optics, such as magnification, power-dependent focal position shift;

of the workpiece, such as cutting volume with the laser beam tool, stability or tolerance values of the machining, process efficiency.

The process characteristics are calculated by the algorithms of the process model. An exception to this would be tolerance and stability values specified by the user on the one hand, and process characteristics that cannot be calculated from the specified machining result during the parameterisation process (e.g., degree of pressure coupling, kerf width). The process characteristics can include measurement data (ACTUAL) as well as calculation data (TARGET).

The machining result is contained in a third data structure. A data record of the machining result includes those properties of the machined part caused by the machining. These include, for example, the burr height, the slag height, the profile height of the cut edge, the surface roughness, the striation frequency, the striation angle (trailing effects, lag). In the deterministic process model, the machining result on the one hand is an input of the parameterisation method with TARGET values of the machining result, and on the other hand an input of the calculation result of the forecasting method with TARGET values. The ACTUAL values of the machining result are determined by a suitable surface measuring method. Particularly suitable for this purpose are measurements of the underside of the workpiece near the kerf and cutting edge surfaces, which are made using contactless optical 3D surface measurement methods. The comparison between a measured ACTUAL value for the machining result on the one hand and the forecasting dataset for the machining result on the other hand is either software-controlled or via a comparator circuit that can be implemented on an electronic processing unit. The comparison takes place fully automatically and preferably without user interaction. The same applies to the comparison between a measured ACTUAL value for the machining result on the one hand and the TARGET specification for the machining result entered by the user on the other hand.

A comparison result is recorded. This is a digital data record. In the simplest case, it can be a binary flag that signals a deviation. The comparison result is output on an output unit on the laser machining tool. The comparison result can be transferred to further applications for further processing in order to initiate suitable adaptation measures.

The application simulation algorithm, the manufacturing forecasting algorithm, the application calibration algorithm and the application calculation algorithm can be part of an application or a computer program. Thus, for example, the application simulation algorithm can be part of an application simulation program, etc. For further details, reference is made to the detailed description of the figures.

An "algorithm" or "program" is understood to mean any type of computer program comprising machine-readable instructions for controlling a functionality of the computer in the context of a laser machining. The computer program can be stored on a data carrier as an executable program file, often in what is termed machine code, which is loaded into the main memory of the computer for execution. The program is processed and executed as a sequence of machine instructions, i.e., processor instructions of the processor(s) of the computer. The program can be in the form of executable code, source code, or interpreted code.

An "interface" is understood as an interface via which data can be received and transmitted (communication interface). The communication interface can be contact-based or contactless. The communication interface can be an internal interface or an external interface that is connected, for example, by means of a cable or wirelessly to an associated device. The communication can take place via a network. A "network" here means any transmission medium with a connection to the communication, in particular a local connection or a local network, in particular a local area network (LAN), a private network, in particular an intranet, and a virtual private network (VPN). For example, a computer system can have a standard radio interface for connection to a WLAN. It can also be a public network, such as the internet. Depending on the embodiment, the communication can also take place via a mobile radio network.

A "memory" is understood to mean both volatile and non-volatile electronic memories or digital storage media. A "non-volatile memory" is understood to mean an electronic memory for the permanent storage of data. A non-volatile memory can be configured as a non-modifiable memory, also referred to as a read-only memory (ROM), or as an alterable memory, also referred to as a non-volatile memory (NVM). In particular, this can be an EEPROM, for example a flash EEPROM, referred to as "flash" for short. A non-volatile memory is characterised by the fact that the data stored thereon remain even after switching off the power supply. Here, a "volatile electronic memory" is a memory for temporary storage of data, which is characterised in that all data is lost after switching off the power supply. In particular, this can be a volatile direct-access memory, also referred to as random-access memory (RAM), or a volatile memory of the processor.

An (electronic) "processing unit" is understood to mean an electronic module which can be designed, for example, as a processor for the computer-based, automatic execution of instructions and can comprise a logic circuit for executing program instructions. The logic circuit can be implemented on one or more discrete components, in particular on a chip. In particular, a "processor" is understood to mean a microprocessor or a microprocessor system comprising a plurality of processor cores and/or a plurality of microprocessors. The processing unit can comprise the forecasting module and/or the parameterisation module.

Another solution to the problem provides a computer program product, with computer program code for performing all the method steps of the method described in more detail above when the computer program is executed on a computer. It is also possible that the computer program is stored on a medium readable by a computer. The computer program product can be designed, for example, as a stored, executable file, possibly with further components (such as libraries, drivers, etc.) or as a computer with the computer program already installed.

In the following detailed description of the figures, non-limiting exemplary embodiments with the features and further advantages thereof will be discussed with reference to the drawings. In these:

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

DETAILED DESCRIPTION OF THE INVENTION

Figure 1:
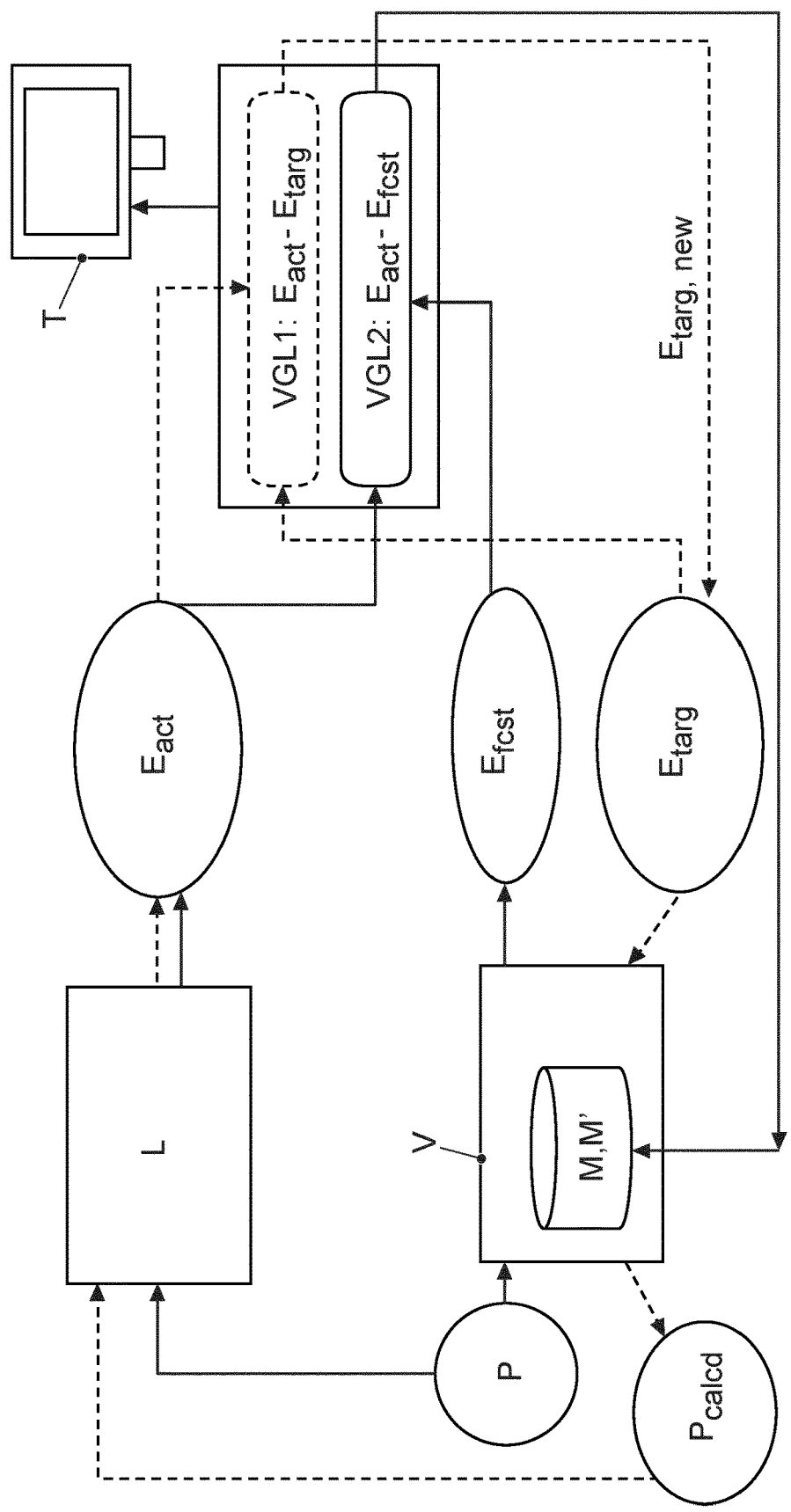
FIG. 1 depicts a schematic overview of a system for parameterisation and/or forecasting for a laser machining on a laser machining tool, according to a preferred embodiment of the invention.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" "A, B, and C" should be understood as including only one of A, only one of B, only one of C, or any combination of A, B, and C.

The invention serves to improve, and in particular to simplify, the operation of laser installations. The setting or parameterisation of the laser installation requires extensive physical knowledge of the relationships between the relevant variables. Thus, the installation parameters to be set or set have a multi-dimensionally coupled correlation to the machining result. The resulting complexity makes it difficult or impossible to intuitively set the installation parameters to achieve a specific machining result. In addition, the user knows little about how the machining process will run at the time of part design. The user also knows little about this at the time of machining. Due to the lack of characterisation and simulation possibilities of the process in the prior art, a process monitoring that is understandable for the user is difficult to impossible. For the user, it is also important to know which parameters must be set when specifying a TARGET value for a machining result, for example, with a specification for the burr height in a melt cut or for a slag height in a flame cut, for the respective manufactured parts so that the desired machining result can be achieved.

The aim of the method proposed here is to control the laser material machining (application) with minimal data input so as to lead to optimal manufacturing. The minimum data input includes the desired part shape (cutting plan) and the desired material (workpiece) as well as the specification of the installation and material. The optimal manufacturing means the achievement of an optimal machining result and is determined autonomously from at least three data structures. At least two application cases, each with at least two fast algorithms, define a data flow between the at least three data structures. The data structures, application cases, algorithms, and data flow form the digital twin of the laser material machining (application). The digital twin is modular and uses, among other things, empirical values to keep the algorithms simple and fast and to ensure the comparability between digital twin and real laser material machining (application). The model includes at least three data structures:

i. Data structure 1 contains the data of the parameter set P;

ii. Data structure 2 contains the process characteristics PKG;

iii. Data structure 3 contains the data of the machining result E;

The data structure 1 forms the data interface between the digital twin of the laser material machining and the real machining installation L. The data structure 3 forms the data interface between the digital twin of the laser material machining and the machining result E of the real laser material machining (application). The minimum of three data structures are dependent on the minimum data input, including cutting plan (user input) and workpiece specifications (material, thickness, size from database), empirical values (averages of collected measured values of the various categories, from database) and/or current measured values (from database) initialised as measured variables or calculation variables, and if necessary initialised further specification data (from database). An advantage over known methods from the prior art is that empirical values can now also be incorporated into a model (here, the digital twin).

The data of the at least three data structures are stored in a database system (e.g., in tabular form). The algorithms of application cases 1 and 2 read the data from the tables or write them into the tables. To do this, the algorithms use a common data interface object to execute the read and write operations on the database system. The algorithms themselves store the data for the respective calculations in the class instances of the digital twin. The database system and the classes of the digital twin are advantageously constructed to be object-oriented and codified in a class diagram.

In a preferred embodiment of the invention, at least two application cases are provided:
i. Application case 1 is the sequential execution
a. of the application calibration algorithm, which maps the values of the machining result E (data structure 3) onto the process characteristics PKG (data structure 2), and
b. of the application calculation algorithm, which maps the process characteristics PKG (data structure 2) onto the parameter set P (data structure 1).
2. Application case 2 is the sequential execution
c. of the application simulation algorithm, which maps the parameter set P (data structure 1) onto the process characteristics PKG (data structure 2) maps, and
d. of the manufacturing forecasting algorithm, which maps the process characteristics PKG (data structure 2) into the machining result E (data structure 3).

In the following, the three data structures are explained in more detail.

The data structure 1 with the parameter set P for the laser material machining contains the parameter data, which by definition contain all influencing variables of the laser material machining (application). This means that the entirety of the data in the data structure 1 defines the digitised parameter data or the machining state before, during and after parts manufacturing. Thus, the data structure 1 is the digital representation of the realised laser material machining on the given installation. It has the function of a data interface between the machining installation and the digital twin. The influencing variables of the data structure 1 are further subdivided. They can include at least the following three sub-data structures of the parameter set (also referred to below as the "machining state"):
Specification:
the specifications of the manufacturing installation, the laser source, the machining head, the workpiece and other influencing components. Examples are specified maximum values for feed or process gas pressure, as well as the wavelength of the laser or material designations of the workpiece.

Contour:
geometric shape of the part contour as a single part or as a cutting plan. Examples are lengths, angles, curvatures, directions of rotation or coordinates of characteristic points on the contour.
Point Data:
all process parameters of the workpiece, the installation and the components thereof that can be changed over the part contour. Examples are laser power, feed, process gas pressure, nozzle spacing, focus position, but also variable workpiece properties such as thickness or temperature.

The data structure 2 (of the digital twin of the laser material machining) contains the process characteristics PKG, which comprises all essential geometric and physical properties of the process zone and the machining process. The entirety of the data in the data structure 2 represent the dynamic processes which interact in the process zone and indicate the properties of the melt and the resulting kerf in numbers. Added to this are productivity indicators, safety-relevant variables (e.g., proportion of radiation loss), and stability or tolerance values. The process characteristics are the result of calculations of the corresponding algorithms of application cases 1 and 2 over the part contour. The most important advantages of the process characteristics are:
1. as purely mathematical variables, they describe the intrinsic properties of the process zone without any influence of variations in measurement data, so they are 100% reproducible;
2. the process characteristics contain variables that either cannot be accessed, or are difficult to access, for a direct measurement, but that directly influence the machining result, which means a strong correlation with the manufacturing result;
3. the process characteristics have a theoretically formal and non-empirical relationship, both with the parameter set and with the machining result.

The process characteristics comprise at least the following six sub-data structures:
Beam Tool:
calculated variables for the laser beam focused in the workpiece. These include, for example, the Rayleigh length, the average laser power, and/or the beam radius at the workpiece top edge.
Kerf:
geometric characteristics of the kerf, such as the average angle of inclination of the cut front and/or various joint widths.
Melt Film:
geometrical characteristics and flow-mechanical characteristics of the melt, such as the ejection thickness or the Péclet number thereof, but also the ejection speed thereof, and further target values of the machining result based on the melt dynamics.
Nozzle:
contains geometric properties of the space between the nozzle and the process zone, but in particular also the pressure coupling efficiency.
Optics:
calculation results for the magnification and the power-dependent focus shift.
Workpiece:
various characteristics in connection with the given material, e.g., the required cutting power, path energy, process efficiency and/or stability parameters.

The third data structure 3 includes the machining result. The machining result includes all data belonging to the result of the machining. From a technical point of view, the values or variables of the machining result are the result of the response function of both digitised and realised parts manufacturing. This includes:

1. the quality measured on the finished component (e.g., burr or slag);
2. the measured kinetics variables measured during machining (installation-internal measurement of the effectively driven parameter dataset);
3. the process signals recorded during machining;
4. the quality forecasts calculated by the manufacturing forecasting algorithm.

Analogous to the data structure 1, the data structure 3 is also a digital image, namely that of the finished component and the quality thereof (machining result). Furthermore, and analogously to the data structure 1, the machining result also functions as a data interface between the measured values and signals of the parts manufacturing and the digital twin.

| Quality variable | Melt cut | Flame cut |
| --- | --- | --- |
| Burr amplitude | X | |
| Slag amplitude | | X |
| Cutting edge profile height | X | X |
| Surface roughness | X | |
| Striation amplitude | | X |
| Striation frequency | | X |
| Striation trailing effect | X | X |

According to the invention, a deterministic process model is provided which is identified in the figures by the reference symbol M and which can be stored in a memory, such as in a database DB. On the basis of this process model, a type of digital twin can be provided for the real laser machining or the associated physical processes.

The invention will be explained in more detail below with reference to the figures and with several exemplary embodiments.

FIG. 1 shows a laser installation L, which is controlled via an electronic processing unit V, e.g., a control computer or a microprocessor-based circuit (e.g., FPGA or ASIC or other integrated circuits). In this processing unit V, the process model M is stored in executable form. The processing unit V can also be designed to execute various algorithms, which will be described in more detail below.

Figure 3:
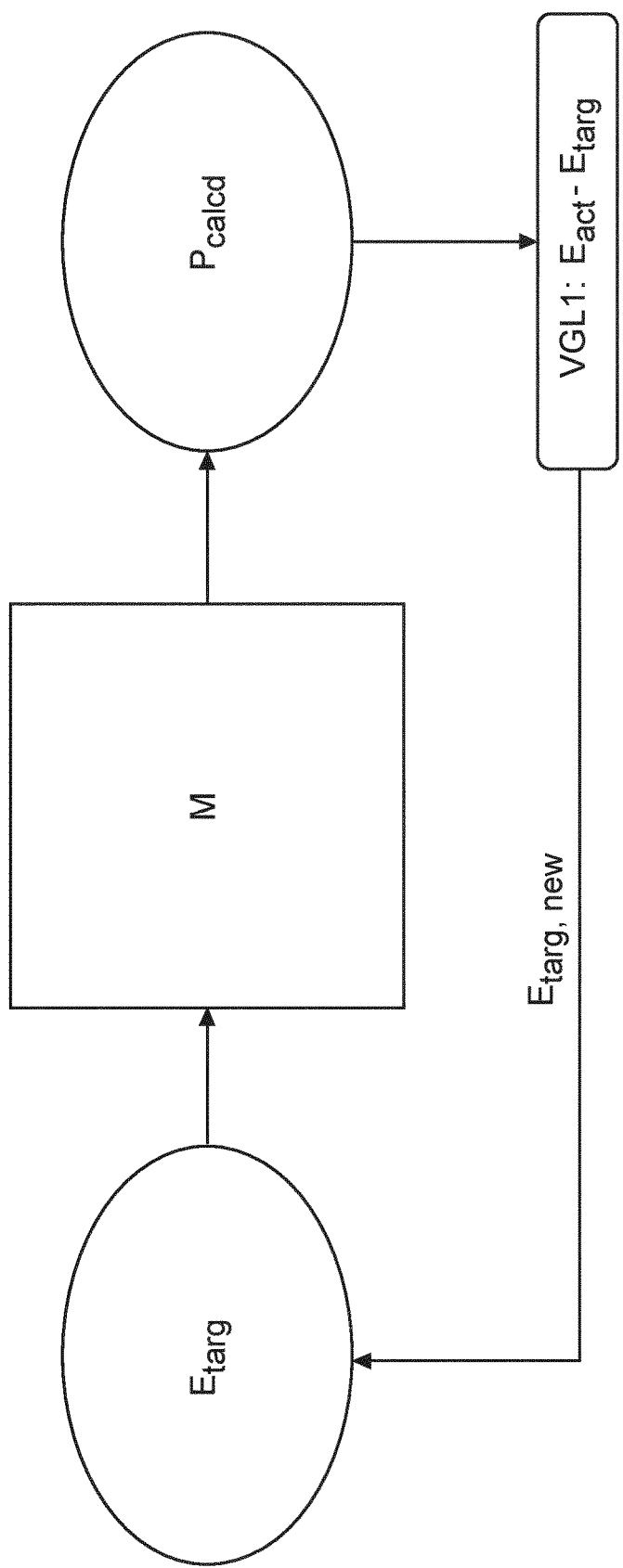
FIG. 3 depicts a schematic representation of a model-based parameterisation method for a laser.

In a first application shown in FIG. 3 and FIG. 1, a TARGET value for a desired machining result $E_{targ}$ is entered by the user, or the target value is acquired from a data structure or a message. From this target value for the machining result $E_{targ}$, a parameter dataset $P_{calcd}$ is calculated, as shown in FIG. 3, by accessing the model M, which parameter dataset is to be set on the laser installation L so that the desired value can be achieved.

This first application is shown in FIG. 1 with dashed lines. Starting at the bottom right, the target value $E_{targ}$ is detected and transmitted to the model M, which calculates a parameter set $P_{calcd}$ therefrom using algorithms. This calculated parameter set $P_{calcd}$ can be transmitted to the laser installation L for control in a subsequent method. After further relevant variables (e.g., cutting plan and workpiece-related data) have been entered, the laser L is operated. Subsequently, the machining result is measured on the manufactured component or workpiece. This is recorded in the measured machining result $E_{act}$. Optionally, an electronic analysis, in particular event-controlled and/or time-controlled further analysis, can be carried out. In particular, a comparison can now be made between the actually measured machining result $E_{act}$ and the target value $E_{targ}$ origi-nally specified or entered by the user. The comparison result VGL1 is output, preferably on a monitor or a terminal T of the laser L and/or used for initiating further steps. In particular, the comparison value can be used to regulate the laser machining method. For example, a new target value for the desired machining result can be determined with the determined comparison value VGL1:

$$E_{target,new} = E_{target} + VGL_1$$

This adaptation of the TARGET value can be controlled by a threshold of VGL1.

Figure 2:
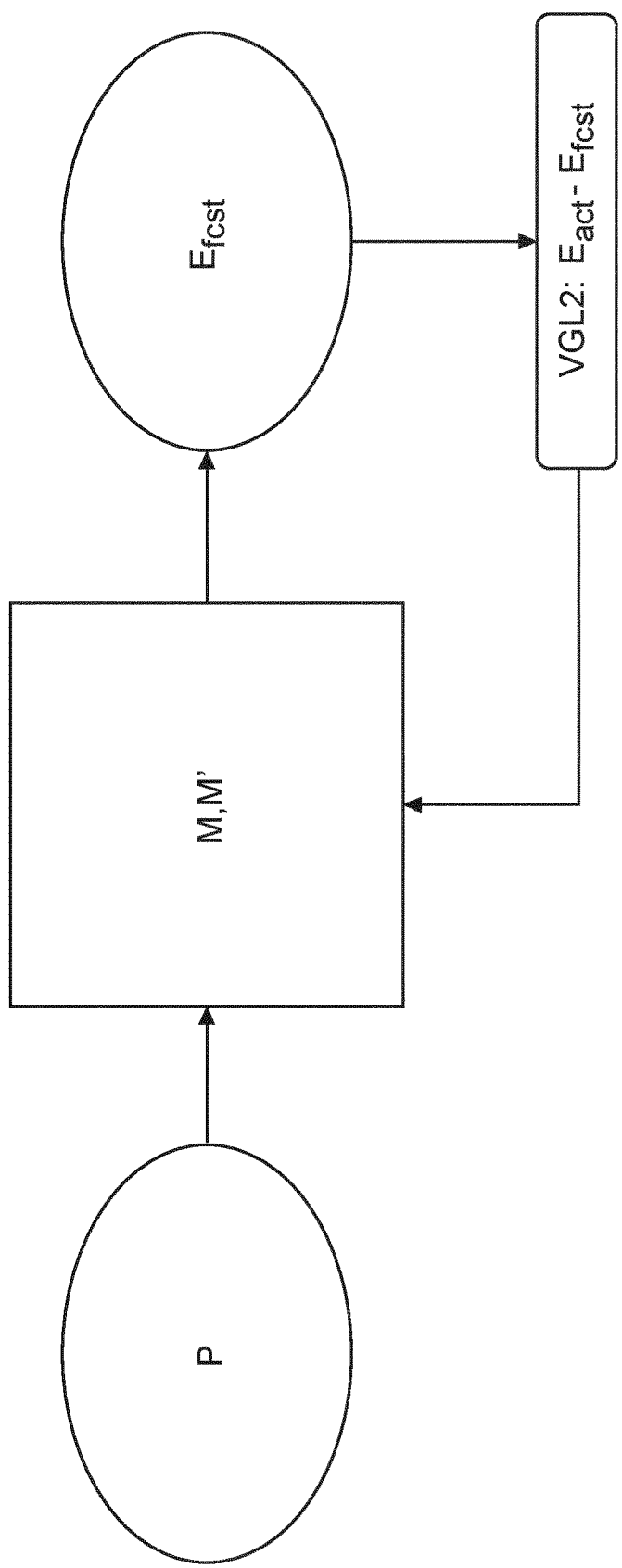
FIG. 2 depicts a schematic representation of a model-based forecasting method.

A second application case is shown schematically in FIG. 2. Here, the opposite case should be calculated. From a given parameter dataset P, a forecasting dataset for the machining result $E_{fcst}$ is created while accessing the model M.

In FIG. 1, this is represented starting with the input of the parameter set P, which is fed to the model M, so that a forecasting $E_{fcst}$ for the machining result $E_{act}$ can be generated, given the parameters P. According to the comparison process mentioned above, in case of application 1, even with the application 2, a comparison value VGL2 can then be calculated between the measured ACTUAL value for the machining result $E_{act}$ and the forecast value $E_{fcst}$. This comparison value VGL2 is output on the terminal T.

With regard to the comparison value VGL2, the technical advantage is that a reproducible deviation from a refinement or calibration of the model can be used. Preferably, upon detection of such a reproducible deviation, a version step is automatically initiated to produce a calibrated model M'. This is represented in FIG. 1 by the solid line from the comparison VGL2 to the model M drawn in thinner line width to indicate that this is optional but a preferred embodiment of the invention. Thus, in this preferred embodiment of the invention, the comparison value VGL2 can be used to automatically calibrate the model M. Furthermore, a temporal and/or statistical evaluation can be carried out to evaluate in which machining phases of the laser there is no deviation and in which phases a deviation has been identified. If, for example, there was no TARGET/ACTUAL deviation in an initial phase, but a deviation has been determined at a later stage, this can possibly indicate an error and/or a gradual soiling of the focusing optics and/or other wear (e.g., on the tip of the process gas nozzle).

In conjunction with FIG. 4, the mode of operation of a parameterisation module ParM is explained below in an exemplary embodiment. The parameterisation module ParM can be implemented on the electronic processing unit V and serves to implement the first application case, which has been described above with reference to FIG. 3. This module is intended to support the user at the laser installation L during the setting and parameterisation thereof. For this purpose, the user enters a TARGET specification for the machining result $E_{targ}$ on a connected terminal T, on which a user interface UI can be provided. This data record is forwarded to the parameterisation module ParM via a corresponding data connection. The parameterisation module ParM then accesses the model M stored in a database DB with the corresponding algorithms, which are explained in more detail below, in order to calculate the parameter set $P_{calcd}$ for the TARGET value $E_{targ}$. This can be output on the user interface UI and, upon detection of a verification signal, this calculated parameter set $P_{calcd}$ can be transmitted directly to the laser L in order to control the laser process.

Optionally, an additional checking of the model M can be performed in a subsequent period. This can be done by a comparator module KOMP by means of a comparison. For this purpose, a machining result $E_{act}$ is measured on the components manufactured with the parameter set and transmitted to the comparator KOMP. The comparator KOMP also has access to the user-entered command $E_{targ}$ and can compare these two data records. The comparison result is output, for example on the user interface UI. If the comparison result signals a deviation, this can automatically trigger a corrective action.

Figure 4:
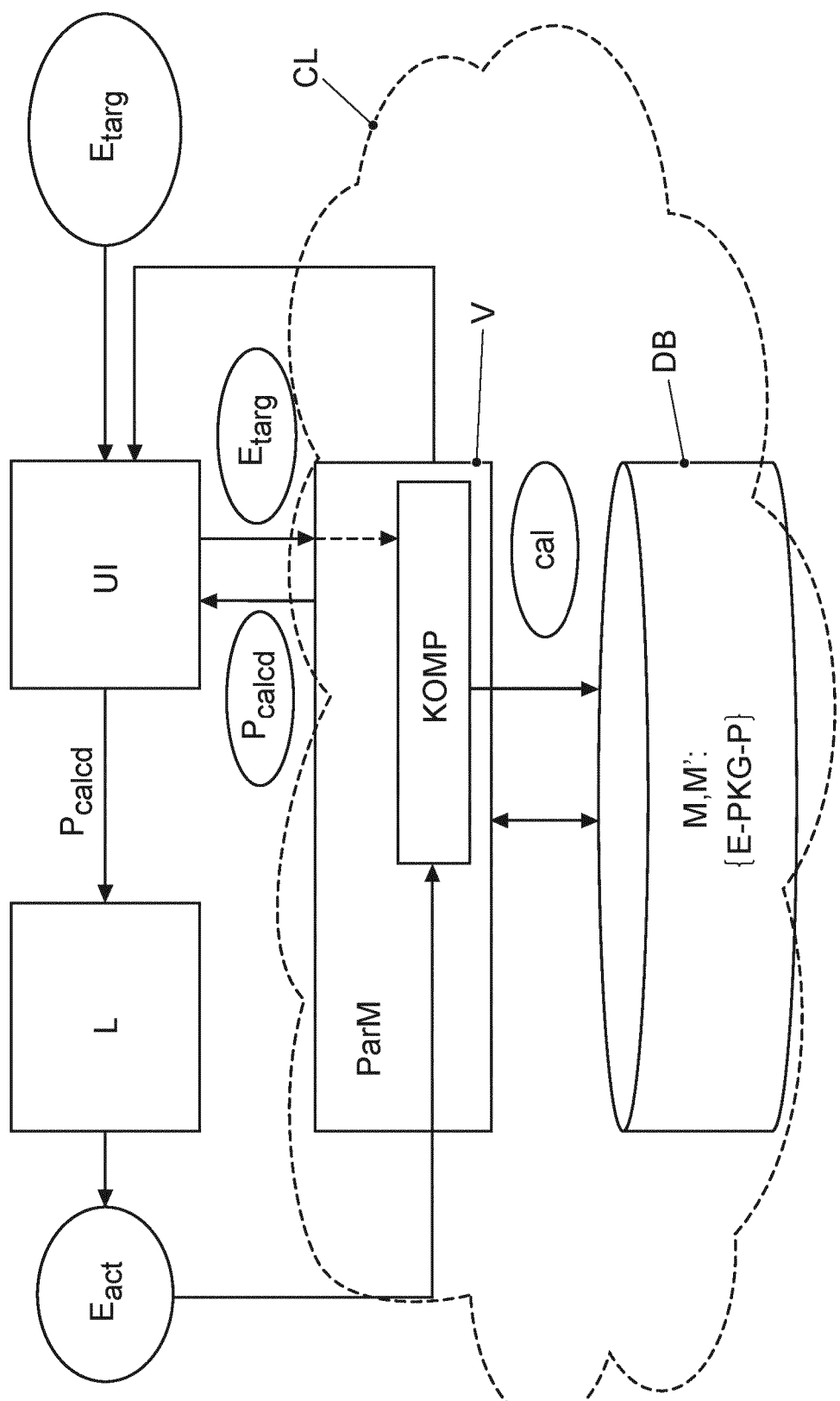
FIG. 4 depicts an overview of a parameterisation module integrated into a laser machining.

As indicated in FIG. 4 by the curved line CL, the above-mentioned components need not necessarily be implemented directly on the laser installation L. Preferably, the user interface UI is arranged on or at the laser installation L and the electronic processing units, such as the parameterisation module ParM, the comparator KOMP and/or the model M that can be provided as a distributed system and on different platforms in the database DB. Furthermore, all or selected components can also be provided as a service on a central server S or in a cloud CL, which can be accessed via a network connection.

In the following, the operation of a forecasting module ProgM is explained by way of example with reference to FIG. 5. The forecasting module ProgM serves to implement the second application case, which has been described above with reference to FIG. 2. The procedure for the forecasting module ProgM essentially corresponds to that which has already been described above with reference to FIG. 4. Only the input (a parameterisation P specified by the user or read in from a data source) and the output (a calculated forecast $E_{fcst}$ for the machining result) have been exchanged.

The forecasting module ProgM calculates a forecast $E_{fcst}$ by accessing the corresponding algorithms from the parameter set P entered. The calculated result $E_{fcst}$ is displayed on the user interface UI.

As explained above, the laser can now be operated in reality with the parameterisation P.

In a later phase, the machining result for this parameterisation P can be measured and fed to the comparator KOMP for comparison with the calculated forecast $E_{fcst}$. In the event of a deviation, this can be output on the user interface UI, for example, to give the user the opportunity to find a modified parameterisation. In addition, further steps can be triggered based on the comparison. In particular, upon detection of a reproducible deviation, an adaptation of the model M can be made and tested as a new version and put into operation.

Figure 5:
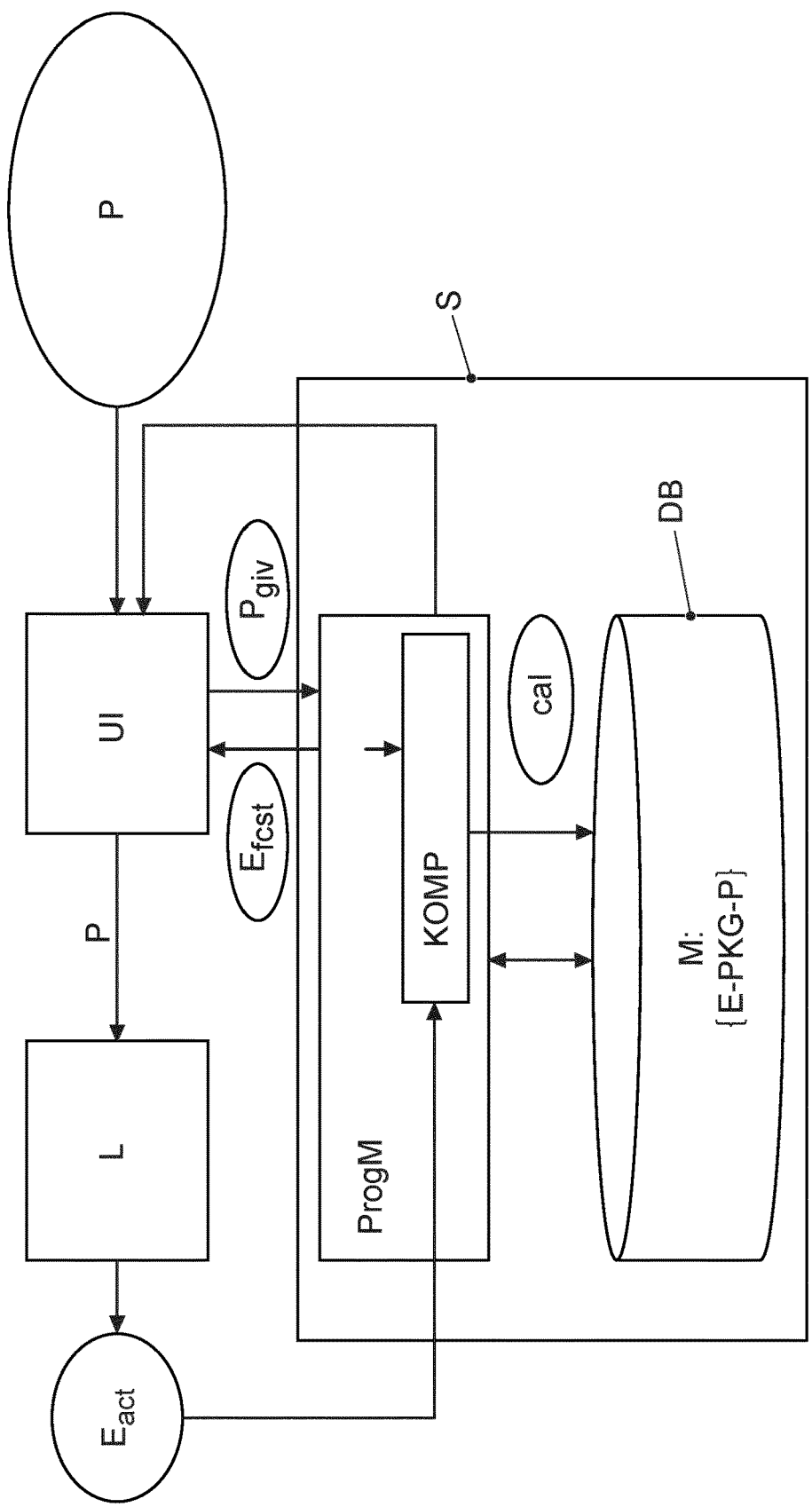
FIG. 5 depicts an overview of a forecasting module integrated into a laser machining.

As shown in the exemplary embodiment illustrated in FIG. 5, the electronic processing units ProgM, DB can be provided on a central server S. This variant also applies to the parameterisation module ParM from FIG. 4. Likewise, the variants described in conjunction with FIG. 4 (cloud-based solution) also apply to the forecasting module ProgM.

Figure 6:
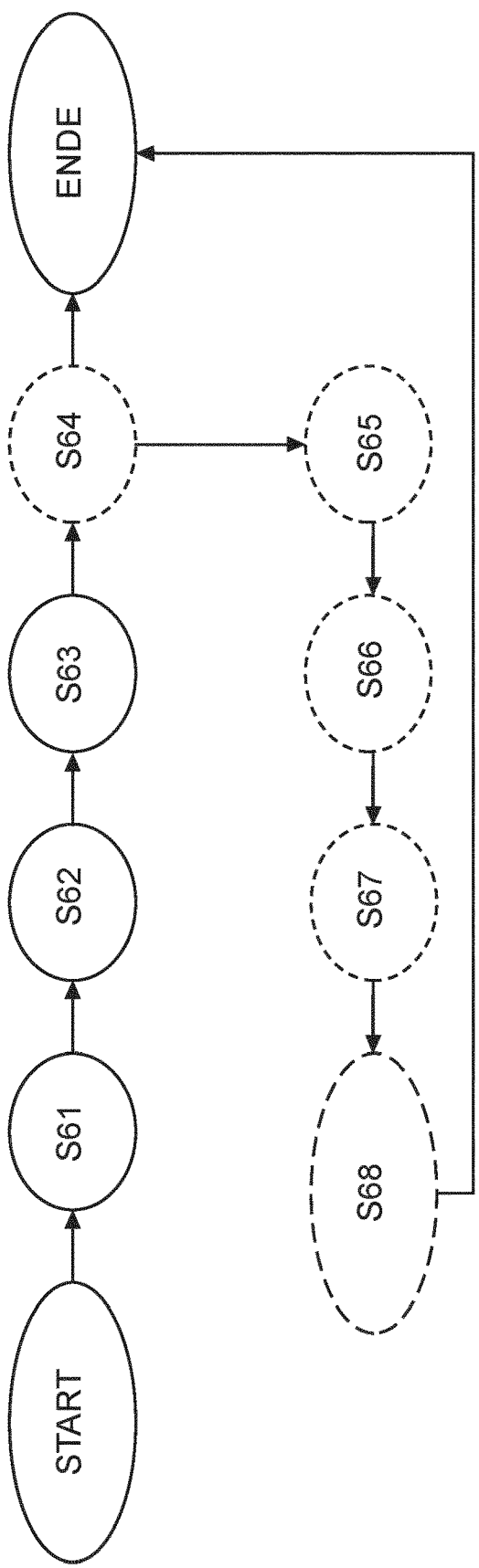
FIG. 6 depicts a flowchart of a forecasting method according to a preferred embodiment of the invention.

FIG. 6 is a flowchart of a forecasting method that can be executed in different flow variants. After the start of the forecasting method, which can be carried out on the forecasting module ProgM, the data for the parameter set P which is to be used to control the laser machining tool L are read in in step S61. In step S62, the deterministic process model M is accessed to calculate in step S63 the forecasting dataset $E_{fcst}$ for the machining result for the read-in parameter set P. In step S64, optionally, the calculation result $E_{fcst}$ can be displayed on a user interface UI to allow the user to change the input directly.

In a further development, the laser machining with the read-in and possibly confirmed parameter set P can be performed in step S65. Subsequently, in step S66, the machining result $E_{act}$ can be measured as the ACTUAL value of the manufactured component to be compared in step S67 with the forecasting dataset $E_{fcst}$ for coincidence and deviation. In the event of a deviation, the calculated comparison value can be output in step S68 (e.g., onto the UI) and/or adaptation procedures can be automatically triggered on the basis of the calculated comparison value; in particular, an adaptation of the model M can be made upon detection of a reproducible deviation and tested as a new version and put into operation. Since the steps S64, S65, S66, S67, S68 are optional, these are shown in FIG. 6 outlined by dashed lines.

Figure 7:
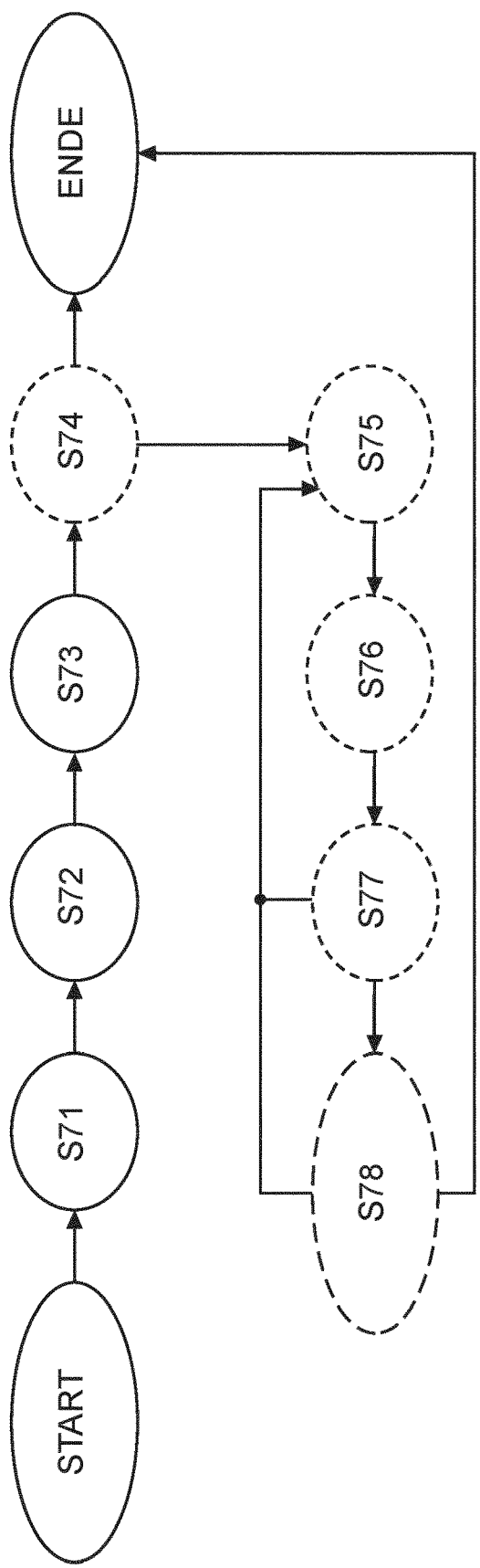
FIG. 7 depicts a flowchart of a parameterisation method according to a preferred embodiment of the invention.

FIG. 7 shows a flow diagram of a parameterisation method which can be executed in different sequence variants. After the method has been started, in step S71 a TARGET value for a machining result $E_{targ}$ is read in. In step S72, the deterministic process model M is accessed to calculate in step S73 at least one parameter set $P_{calcd}$ for the read-in TARGET value $E_{targ}$. Optionally, the calculated parameter set $P_{calcd}$ can be output in step S74, for example on the UI interface.

In step S75, a workpiece can optionally be machined using the calculated parameter set $P_{calcd}$. In step S76, an ACTUAL value for the machining result $E_{act}$ can be measured on the manufactured workpiece. In step S77, the comparison between the TARGET value $E_{targ}$ and the ACTUAL value $E_{act}$ for the machining result can be calculated. If there is a deviation, the calculated comparison value can be output in step S78. Alternatively or cumulatively, adaptation procedures can be triggered and executed on the basis of the calculated comparison value. In particular, the read-in TARGET value $E_{targ}$ can be adapted so that the measured ACTUAL value for the machining result $E_{act}$ can be maintained. In accordance with FIG. 6, the optional steps in FIG. 7 are also shown in broken lines.

The method has at least two application cases, each of which contains at least two sequentially executed algorithms. The algorithms of the first application case are the application calibration (algorithm 1) and the application calculation (algorithm 2). The algorithms of the second application case are the application simulation (algorithm 3) and the manufacturing forecasting (algorithm 4). The two application cases form the inverse of each other, which implies that the sequential execution of Algorithms 1 through 4 provides identity mapping and allows for self-checking of the digital twin.

The algorithms of the application cases are described in more detail below. The application calibration is the functional relationship between all the variables of the machining result (data structure 3) of the laser material machining (application) and the process characteristics (data structure 2). This functional relationship is based on the measured values acquired at the time after machining (ex situ). The application calibration can include empirical (statistical) or calculated (theoretical) functions.

Figure 8:
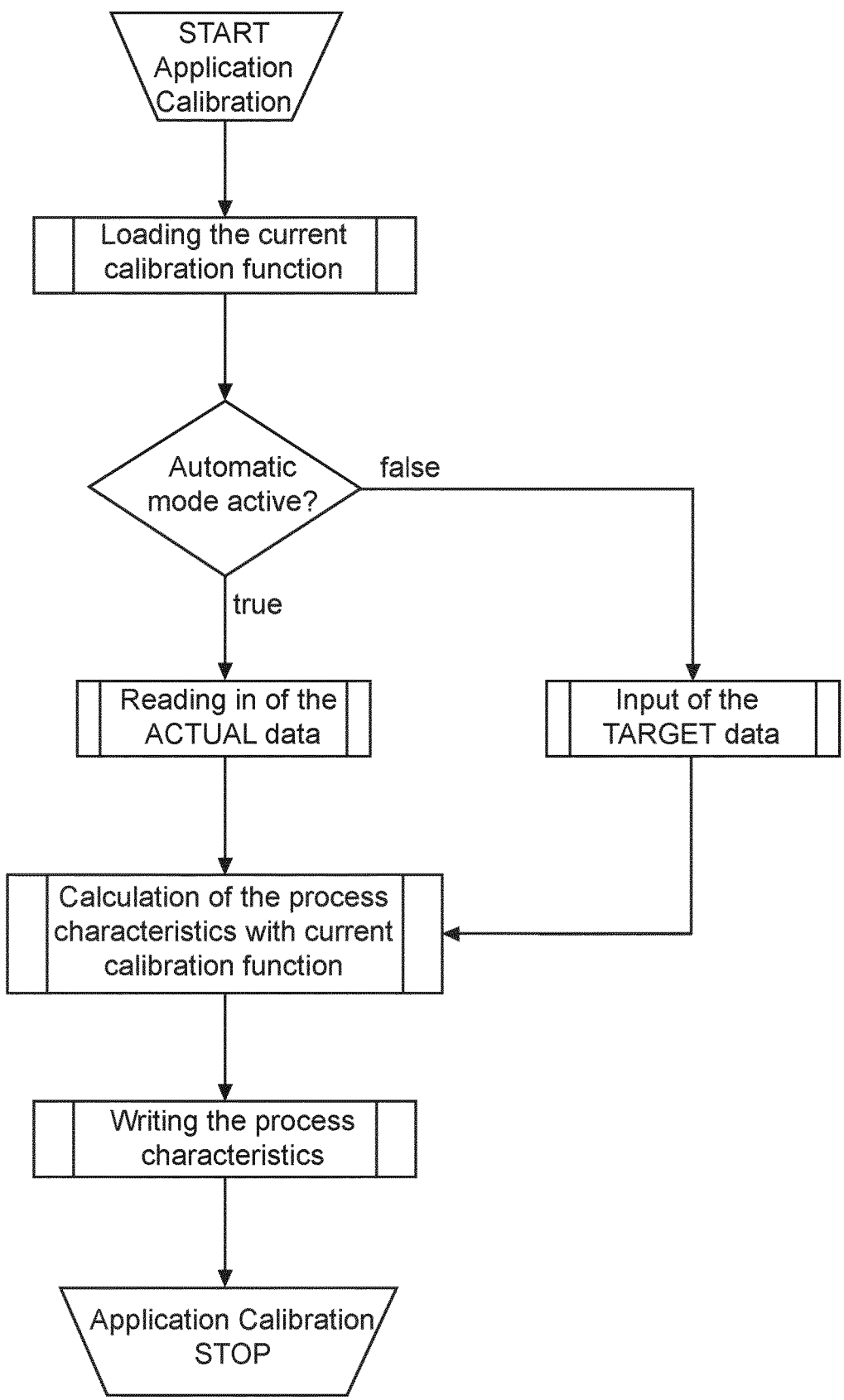
FIG. 8 depicts a flowchart for an application calibration algorithm.

The application calibration algorithm is shown in a flowchart in FIG. 8. This algorithm calculates the corresponding process characteristics PKG from the TARGET machining result in data structure 3, which was entered by the user, for example.

An application example for the application calibration algorithm will be described in more detail below with reference to FIG. 9.

Figure 9:
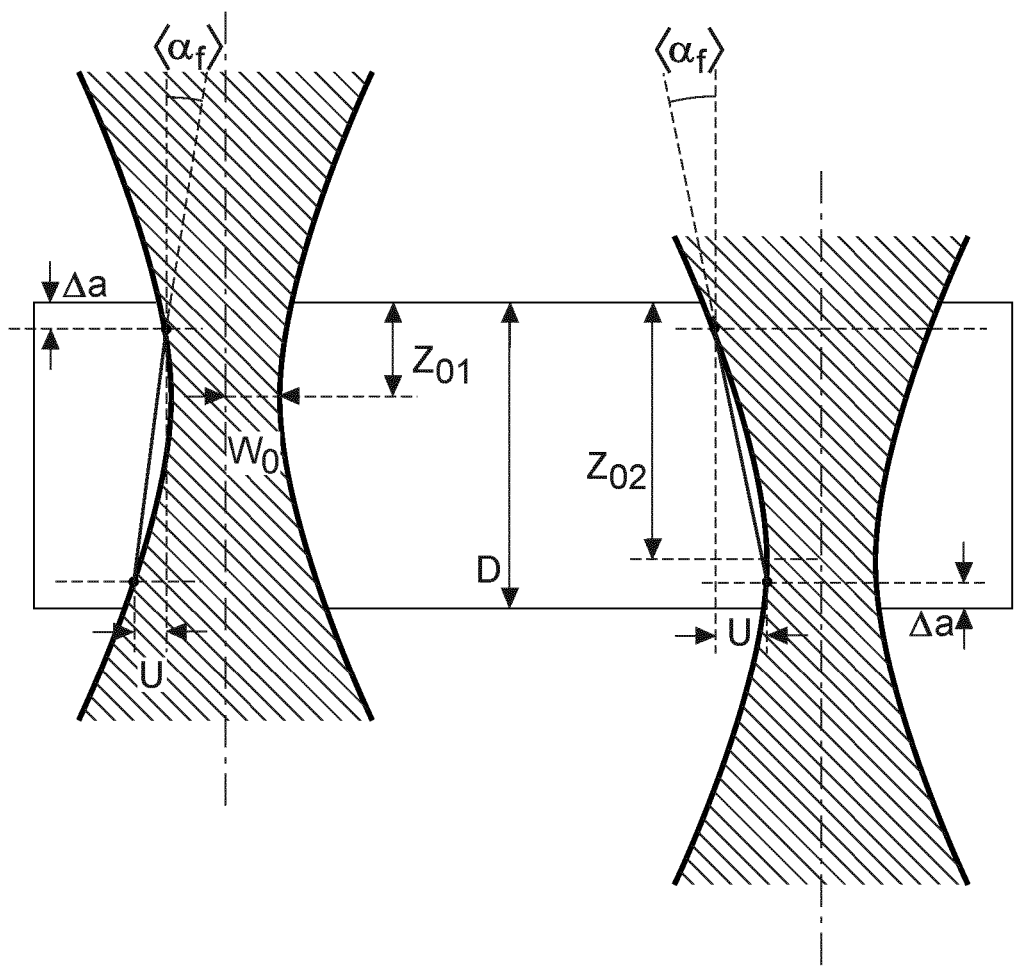
FIG. 9 depicts a schematic representation of a kerf of a manufactured component for illustrating a cone angle.

Two laser beams, which are focused with different focus position in the workpiece are shown in FIG. 9. This results in a different inclination of the joint walls, which is designated with the average value of the angle of inclination $<\alpha_j>$ of the cut surface. The angle of inclination is determined by the calibration function.

$$\tan\langle\alpha_f\rangle = \frac{u}{D - 2\Delta a}$$

The workpiece thickness D is specified therein, the shortening Δa of the joint height is defined in the standard, and the cutting edge profile height u is a value of the machining result (as the ACTUAL value of the associated measuring method, as the TARGET value of the user). In the model assumption, u is also the difference in the beam radii at the ends of the shortened joint height:

$$u = W(\Delta a) - W(D - \Delta a)$$

The beam radius function is given by $$W(z) = W_0 \cdot \sqrt{1 + \left(\frac{z - z_0}{z_R}\right)^2}$$

with the focus radius $W_0$ and the focal length $Z_R$.

According to the application calibration flowchart, the following steps are now executed:

the user gives the desired cutting edge profile height u as a machining result (TARGET value) before (or u is read from the data structure 3 in the "automatic mode" as the current measured value for the application);

the application calibration algorithm calculates the process characteristic using the above calibration function $\langle a_f\rangle$;

the algorithm writes the calculated value of $\langle a_f\rangle$ into the data structure 2 of the process characteristics.

The deterministic model provides a calibration function for each additional variable of the machining result, in the application calibration algorithm.

Figure 10:
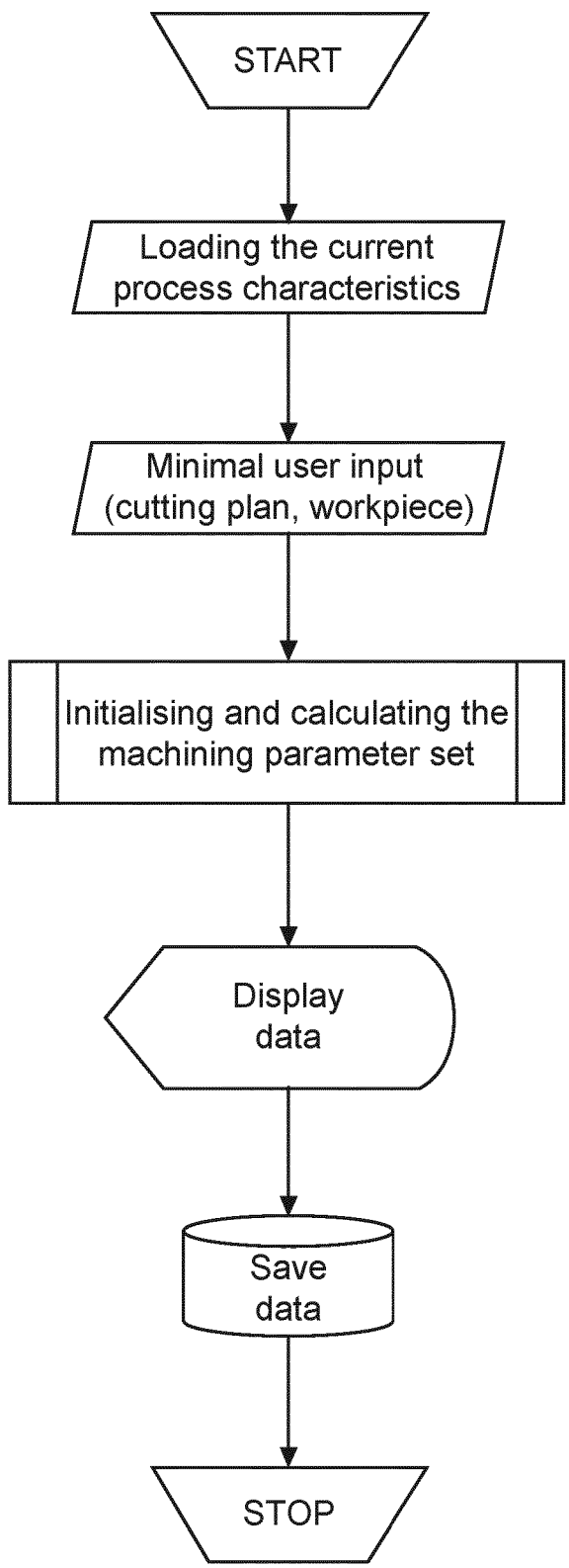
FIG. 10 depicts a flowchart for an application calculation algorithm according to a preferred embodiment of the invention.

The algorithm for the application calculation is shown in FIG. 10 in a flowchart. Consequently, first the machining result variables calculated in the previously executed algorithm of the application calibration are loaded. Subsequently, the details of the cutting plan and workpiece must be entered. This is usually done by the user or by the upstream control unit in the automated manufacturing flow.

The parameter set P is calculated in the central procedure of the application calculation. In particular, the variable machining parameters (e.g., feed, power, pressure, focus position) are calculated because a large part of the data structure 2 with the parameter set P is already given by the specifications and the data from the minimum user input.

When the application calculation is complete, the data are displayed and saved, and the manufacturing is either started or changed. In a preferred development, the manufacturing or the current laser machining process can be controlled on the basis of the calculated values by changing the calculated parameters manually or automatically during machining. The change is made in response to the TARGET/ACTUAL comparison by accessing the model M.

The algorithm for the application calculation will be described below with reference to an application example: "Inclination angle of the cut surface" described in more detail.

In the section on the application calibration algorithm, it was shown as an example how the process characteristic αf (average angle of inclination of the cut surface) is calculated from the machining result u (profile height as a measure of the flatness of the cut surface).

The application calculation now loads the calculated cone angle αf of the kerf and all other current process characteristics and calculates therefrom the parameter set P, in particular the variable machining parameters of the manufacturing. For the example of the average angle of inclination of the cut surface, the transcendental equation provides $$\sqrt{1 + \left(\frac{\Delta a - z_0}{z_R}\right)^2} - \sqrt{1 + \left(\frac{D - \Delta a - z_0}{z_R}\right)^2} - \frac{D - 2\Delta a}{W_0} \cdot \tan\langle\alpha_f\rangle = 0$$

the sought focal position z_0 as a variable of the parameter set. On the subsequently cut sample, u can be measured again (as $E_{act}$) and checked.

The application case 2 of the method comprises the application simulation, followed by the manufacturing forecasting. The application case 2 is the inverse function of the application case 1, consisting of the application calibration, followed by the application calculation. The consequence of this is that application calibration and manufacturing forecasting are mutually inverse algorithms, as are the application calculation and application simulation.

Figure 11:
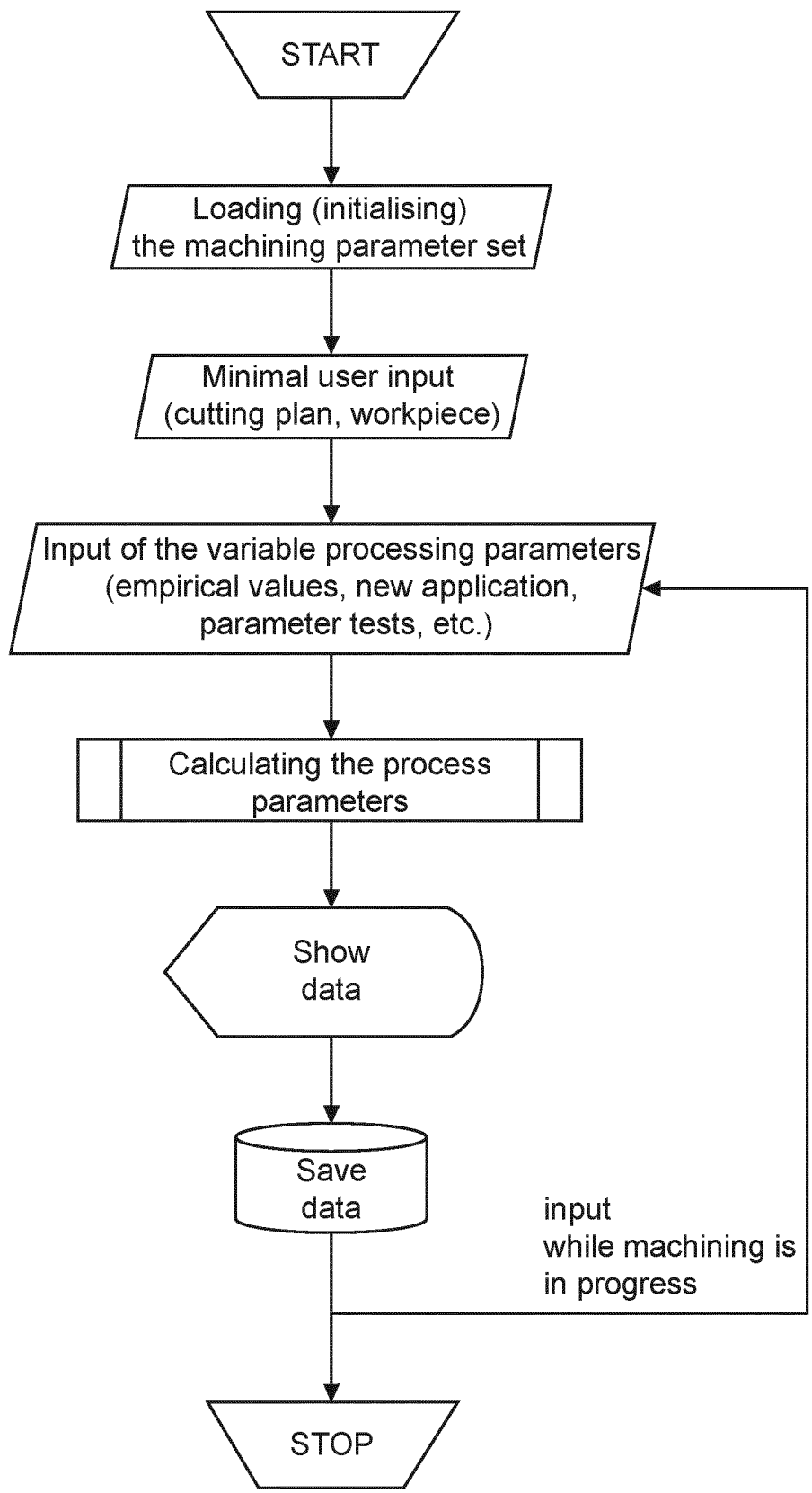
FIG. 11 depicts a flowchart for an application simulation algorithm according to a preferred embodiment of the invention.

The application simulation will be described in more detail below with reference to FIG. 11. In the application simulation, the data of the parameter set P are used to forecast the expected machining result E on the manufactured sample. First, the already fixed data, for example specifications, are loaded. Subsequently, the cutting plan (contour) and the workpiece (geometry, material) are entered: This is by definition the minimum user input. Finally, the variable machining parameters (data at the contour points), for example the power, the feed and the focus position, are entered or read in from a data structure.

If all data of the parameter set P are completely available, the application simulation calculates the process characteristics PKG therefrom, displays them and saves them.

The variable machining parameters of the parameter set P can be changed even if the manufacturing is already running. The manufacturing and the calculation of the process characteristics are then automatically updated each time.

Application example: "Inclination angle of the cut surface"

In the application calculation, the focal position z_0 had to be determined numerically from a transcendental equation. Here, in the application simulation, the inverse procedure is used, wherein the focus position is specified as a value in the data structure 1 of the parameter set P. From this, the inclination angle of the cut surface is calculated with $$\tan\langle\alpha_f\rangle = \frac{W_0}{D - 2\Delta a} \cdot \left(\sqrt{1 + \left(\frac{\Delta a - z_0}{z_R}\right)^2} - \sqrt{1 + \left(\frac{D - \Delta a - z_0}{z_R}\right)^2}\right)$$

and stored as the value of the process characteristics PKG in the data structure 2.

Figure 12:
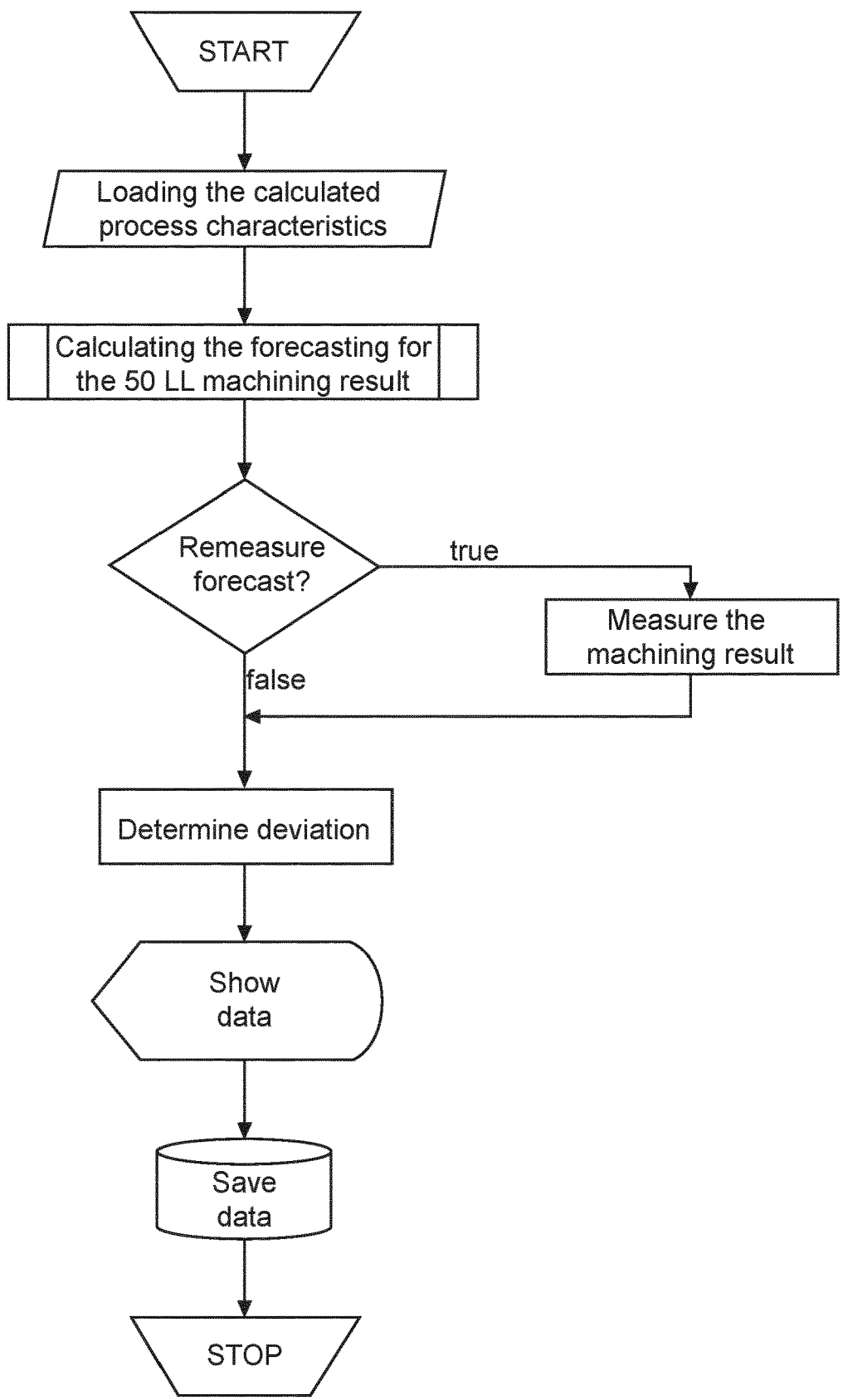
FIG. 12 depicts a flowchart for a manufacturing forecasting algorithm according to a preferred embodiment of the invention; and, FIG. 13 depicts a graph of an averaged profile curve of the profile height of the cut surface.

The manufacturing forecasting is the inverse algorithm or the inverse function of the application calibration, and will be described below with reference to FIG. 12.

First, the process characteristics calculated with the application simulation are loaded. Then the functions of the algorithm for the manufacturing forecasting are applied; as a result of these calculations one obtains the calculated or forecast data for the (expected) machining result $E_{targ}$. If, for example, it is decided in the course of an experiment or a random check that the manufacturing forecasting (and thus the application calibration) must be remeasured, the corresponding measuring methods are carried out, whereby the measured values of the machining result $E_{act}$ are obtained.

The comparison between the calculated and the measured machining result $E_{act}$-$E_{targ}$, starting from the same parameter set P, provides the correlation between ACTUAL and TARGET and allows the determination of the correction data for the two algorithms of the parameterisation.

Application example: Inclination angle of the cut surface

The process characteristic PKG of the inclination angle of was calculated and stored from the parameter set P. This value is now read by the manufacturing forecasting (together with other values of the process characteristics) and thus with:

$$u=(D-2\Delta a)\cdot\tan \langle a_f \rangle$$

the profile height u is calculated. As a calculated value, this machining result dataset represents a nominal value, which can now be determined with the corresponding measurement.

The following describes how the profile height of the interface can be measured and fed as an input dataset into the algorithms described above.

With a surface measuring device, a section of a cut surface on the sample is recorded (preferably in a non-contact manner). With an optical detection device (e.g., CCD camera—macroscope or microscope with a variable focal plane, white light interferometer) an image of the sample is detected, in which the cut surface is shown, for example, of a structural steel of thickness 15 mm. The cut surface has the typical characteristics of a flame cut (periodic striation formation at the top, at the bottom wide and irregular striations with trailing effects). Above the sample, a reference surface with high flatness is clamped together to compensate for the clamping angle. Basically, the sample to be measured in the measuring space of the surface measuring device is clamped together with a reference surface in the sample holder. The flat reference surface is at right angles to the cutting surface the orientation of which can be attributed to the reference surface. The result of such a measurement can be displayed and output in the form of a false colour image.

Figure 13:
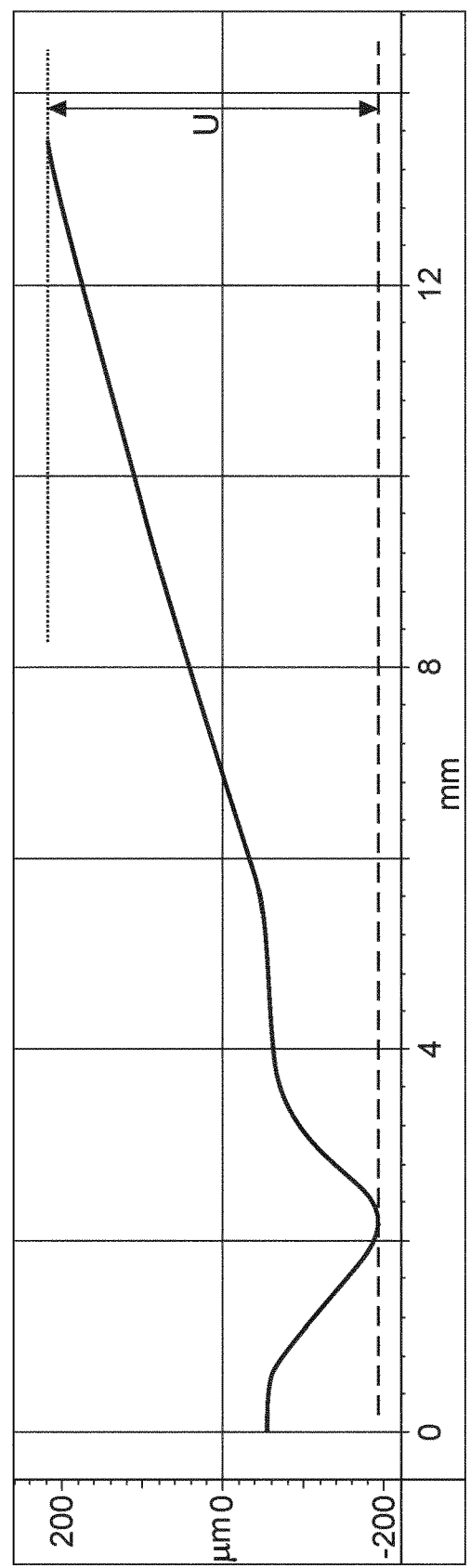

The actual measuring range affects only one image section, so that only a smaller rectangular or polygonal section of the cut surface is considered. This section can be approximately 13 mm long and 8 mm wide, resulting in a $\Delta a$ of approximately one millimetre. The averaged profile curve of the cut surface in the vertical direction is now recorded over this rectangular measuring range. The averaged profile curve is shown graphically in FIG. 13. In the profile curve, the minimum (dashed line) and the maximum (dotted line) can now be distinguished. The difference between maximum and minimum results in the profile height u as a measured variable for the machining result $E_{act}$. The sign of u is positive if the depth of cut z (horizontal axis of the profile curve) of the minimum is smaller than that of the maximum.

After the profile height u has been determined, the measured value is written into the data structure 3 of the machining result E. In the preceding text sections on the application example of the cone angle of the kerf, it is described how this value can be used for comparison with the calculated or user-entered TARGET values.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

In particular, it will be apparent to a person skilled in the art that the invention can be applied not only to laser installations L for cutting, but also to other applications such as welding and/or labelling and/or engraving and/or drilling. Furthermore, the components of the terminal T, of the comparator and of the electronic processing unit V can be incorporated in a unit of hardware or can also be realised distributed over a plurality of physical products. In addition, the above-mentioned components can be arranged directly on the laser. Likewise, the parameterisation module ParM and/or the forecasting module ProgM can be formed locally on or at the laser. Alternatively, it can also be designed as a cloud system or on a server and be in data exchange with the laser L.

The scope of protection of the present invention is given by the following claims and is not limited by the features explained in the description or shown in the figures. Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A method for self-checking a deterministic process model (M) of a laser cutting process of a manufactured component, the method comprising:
   when a parameter set is provided as input, executes the following forecasting steps:
      reading in the parameter set configured to drive a laser cutting tool;
      accessing the deterministic process model in order to calculate a forecasting dataset for a machining result for the read-in parameter set, wherein the deterministic process model uses at least three data structures and models physical, multidimensional relationships between the parameter set and process characteristics representing a physical laser cutting process and the machining result;
      executing a laser cutting with the read-in parameter set;
      measuring the machining result as ACTUAL values of the manufactured component;
      comparing the measured ACTUAL values for the machining result with the forecasting dataset for the machining result by providing a comparison result; and
   when a TARGET value for the machining result is provided as the input, executes the following parameterisation steps:
      reading in the TARGET value for the machining result;
      accessing the deterministic process model in order to calculate at least one parameter set for the read-in TARGET value for the machining result which satisfies the TARGET value, and wherein the steps of forecasting is a digital counterpart of the parameterisation steps and mathematical inverse thereto;
      cutting a workpiece with the calculated parameter set;
      measuring an ACTUAL value for the machining result on the cut workpiece;
      comparing between the TARGET value and the ACTUAL value for the machining result;

wherein the method further comprising considering the comparison result as a deviation and adapts the deterministic process model upon detection of a reproducible deviation; and wherein parameterisation steps of cutting, measuring, comparing and adapting the deterministic process model are iteratively repeated until the deviation between the TARGET value and the ACTUAL value for the cutting result falls below a preconfigurable threshold value.

2. The method according to claim 1, wherein the machining result is at least one of a data tuple with measurable information on the quality of the laser cutting process; and information on at least one of a burr height in a melt cut, a slag height in a flame cut, an edge slope, an edge waviness and an edge profile height, a surface roughness, a striation height, and a striation frequency.

3. A non-transitory computer readable medium storing computer program having program code or program means, wherein, when the computer program is executed on a computer, causes the computer to execute a method for self-checking a deterministic process model of a laser cutting process, the method comprising:
when a parameter set is provided as input, executes the following forecasting steps:
reading in the parameter set configured to drive a laser cutting tool;
accessing the deterministic process model in order to calculate a forecasting dataset for a machining result for the read-in parameter set, wherein the deterministic process model uses at least three data structures and models physical, multidimensional relationships between the parameter set and process characteristics representing a physical laser cutting process and the machining result;
executing a laser cutting with the read-in parameter set;
measuring the machining result as ACTUAL values of the manufactured component;
comparing the measured ACTUAL values for the machining result with the forecasting dataset for the machining result by providing a comparison result; and
when a TARGET value for the machining result is provided as the input, executes the following parameterisation steps:
reading in the TARGET value for the machining result;
accessing the deterministic process model in order to calculate at least one parameter set for the read-in TARGET value for the machining result which satisfies the TARGET value, and wherein the steps of forecasting is a digital counterpart of the parameterisation steps and mathematical inverse thereto;
cutting a workpiece with the calculated parameter set;
measuring an ACTUAL value for the machining result on the cut workpiece;
comparing between the TARGET value and the ACTUAL value for the machining result;
wherein the method further comprises considering the comparison result as a deviation and adapts the deterministic process model upon detection of a reproducible deviation; and
wherein the parameterisation steps of cutting, measuring, comparing and adapting the deterministic process model are iteratively repeated until the deviation between the TARGET value and the ACTUAL value for the cutting result falls below a preconfigurable threshold value.

4. A laser cutting tool with a parameterisation module and a forecasting module configured for self-checking a deterministic process model of a laser cutting process, the laser cutting tool comprising:
an electronic processing unit configured to, when provided with a parameter set as input, executes the following forecasting steps:
reading in the parameter set which serves to drive the laser cutting tool;
accessing the deterministic process model in order to calculate a forecasting dataset for a machining result for the read-in parameter set, wherein the deterministic process model uses at least three data structures, and models physical, multidimensional relationships between the parameter set and process characteristics representing a physical laser cutting process and the machining result;
executing a laser cutting with the read-in parameter set;
measuring the machining result as ACTUAL values of the manufactured component;
comparing the measured ACTUAL values for the machining result with the forecasting dataset for the machining result by providing a comparison result; and
wherein the electronic processing unit is further configured to, when provided with a TARGET value for the machining result as the input, executes the following parameterisation steps:
reading in the TARGET value for the machining result;
accessing the deterministic process model in order to calculate at least one parameter set for the read-in TARGET value for the machining result which satisfies the TARGET value, and wherein the steps of forecasting is a digital counterpart of the parameterisation steps and mathematical inverse thereto;
cutting a workpiece with the calculated parameter set;
measuring an ACTUAL value for the machining result on the cut workpiece;
comparing between the TARGET value and the ACTUAL value for the machining result;
wherein the electronic processing unit is further configured to consider the comparison result as a deviation and adapts the deterministic process model upon detection of a reproducible deviation; and
wherein the parameterisation steps of cutting, measuring, comparing and adapting the deterministic process model are iteratively repeated until the deviation between the TARGET value and the ACTUAL value for the cutting result falls below a preconfigurable threshold value.

5. A system for operating a laser cutting tool for cutting workpieces, comprising:
a database arranged at the laser cutting tool with a parameterisation module and a forecasting module, the laser cutting tool configured for self-checking a deterministic process model of a laser cutting process,
an electronic processing unit configured to, when provided with a parameter set as input, executes the following forecasting steps:
read in the parameter set which serves to drive the laser cutting tool;
access the deterministic process model in order to calculate a forecasting dataset for a machining result for the read-in parameter set, wherein the deterministic process model uses at least three data structures, and models physical, multidimensional relationships between the parameter set and process characteristics representing a physical laser cutting process and the machining result;

execute a laser cutting with the read-in parameter set;

measure the machining result as ACTUAL values of the manufactured component;

compare the measured ACTUAL values for the machining result with the forecasting dataset for the machining result by providing a comparison result; and wherein the electronic processing unit is further configured to, when provided with a TARGET value for the machining result as the input, execute the following parameterisation steps:

reading in the TARGET value for the machining result;

accessing the deterministic process model in order to calculate at least one parameter set for the read-in TARGET value for the machining result which satisfies the TARGET value, and wherein the steps of forecasting is a digital counterpart of the parameterisation steps and mathematical inverse thereto;

cutting a workpiece with the calculated parameter set;

measuring an ACTUAL value for the machining result on the cut workpiece;

comparing between the TARGET value and the ACTUAL value for the machining result;

wherein the electronic processing unit is further configured to consider the comparison result as a deviation and adapts the deterministic process model upon detection of a reproducible deviation; and wherein the parameterisation steps of cutting, measuring, comparing and adapting the deterministic process model are iteratively repeated until the deviation between the TARGET value and the ACTUAL value for the cutting result falls below a preconfigurable threshold value;

a user interface for inputting and outputting data;

a memory for storing the deterministic process model, the memory comprising:

a first data structure in which a number of parameter sets is stored, wherein the first data structure represents a data interface to the laser cutting tool;

a second data structure in which a number of calculated process characteristics is stored; and a third data structure in which a number of cutting results is stored, wherein the third data structure represents a data interface to a measuring device for measuring cutting results from the laser cutting tool;

wherein the electronic processing unit configured to execute a set of model algorithms on the deterministic process model;

a data connection between data structures, the memory, the electronic processing unit and the laser cutting tool; and wherein the electronic processing unit further comprises a comparator module configured for automatic self-checking of the deterministic process model by sequentially executing inverse model algorithms for each input and checking whether a result of the sequential execution is identical to the input.

6. The system according to claim 5, wherein the input is a parameter set or a TARGET value for the machining result.

* * * * *